United States Patent
Hu

(10) Patent No.: US 12,418,848 B2
(45) Date of Patent: Sep. 16, 2025

(54) COMMUNICATION METHOD AND APPARATUS

(71) Applicant: HUAWEI TECHNOLOGIES CO., LTD., GuangDong (CN)

(72) Inventor: Weihua Hu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 369 days.

(21) Appl. No.: 18/184,998

(22) Filed: Mar. 16, 2023

(65) Prior Publication Data

US 2023/0224795 A1    Jul. 13, 2023

Related U.S. Application Data

(63) Continuation of application No. PCT/CN2020/116001, filed on Sep. 17, 2020.

(51) Int. Cl.
*H04W 40/12*    (2009.01)
*H04L 45/24*    (2022.01)
*H04W 40/24*    (2009.01)

(52) U.S. Cl.
CPC .......... *H04W 40/12* (2013.01); *H04L 45/24* (2013.01); *H04W 40/246* (2013.01)

(58) Field of Classification Search
CPC ...... H04W 40/12; H04W 40/246; H04L 45/24
See application file for complete search history.

(56) References Cited

U.S. PATENT DOCUMENTS 9,872,172 B2 *   1/2018   Nylander ............... H04W 8/26

FOREIGN PATENT DOCUMENTS

| EP | 3319392 B1 | 5/2022 | |
| WO | WO-2014209385 A1 * | 12/2014 | ............ H04W 48/18 |
| WO | 2017020176 A1 | 2/2017 | |
| WO | WO-2020188117 A1 * | 9/2020 | |

* cited by examiner

*Primary Examiner* — Brian J. Gillis
(74) *Attorney, Agent, or Firm* — Rimon PC

(57) ABSTRACT

A communication method and apparatus are provided. The method includes: A control plane device obtains first information of a first terminal device, where the first information indicates a terminal device that has mutual trust with the first terminal device, and the terminal device that has mutual trust with the first terminal device includes a second terminal device. The control plane device sends a first message to a first user plane device, where the first message includes route configuration information, the route configuration information is used to configure a first transmission path, the first transmission path is used to forward data to a second terminal device via the first terminal device, and the first user plane device is configured to provide a user plane data forwarding service for the first terminal device.

19 Claims, 9 Drawing Sheets

COMMUNICATION METHOD AND APPARATUS

CROSS-REFERENCE TO RELATED APPLICATIONS

This application is a continuation of International Application No. PCT/CN2020/116001, filed on Sep. 17, 2020, the disclosure of which is hereby incorporated by reference in its entirety.

TECHNICAL FIELD

This application relates to the field of wireless communication technologies, and in particular, to a communication method and apparatus.

BACKGROUND

In 5th generation (5G) mobile communication, a terminal device may establish two air interface connections to a base station by using a dual connectivity (DC) technology, so that an access rate can be improved, and reliability of an air interface segment connection can be improved. However, if the terminal device is located at a network edge or has a signal blockage, even if the terminal device establishes the two air interface connections, quality of an air interface communication link cannot be ensured, and an effect of reliability improvement is not achieved.

Moreover, in a dual connectivity solution, the terminal device needs to use a wireless module that supports dual connectivity. This significantly increases complexity and costs of the terminal device. In addition, a network side needs to support overlapping coverage of a plurality of base stations. This significantly increases difficulty in network deployment.

In conclusion, how to provide a communication solution that is easy to deploy and can ensure communication reliability for a terminal device without increasing complexity and costs of the terminal device is an urgent problem to be resolved.

SUMMARY

This application provides a communication method and apparatus, to provide a communication solution that is easy to deploy and can ensure communication reliability.

According to a first aspect, this application provides a communication method. The method is applied to forwarding data by a first terminal device to another terminal device. The method is performed by a control plane device or a module in the control plane device. Herein, an example in which the control plane device is an execution body is used for description. The method includes: The control plane device obtains first information of the first terminal device, where the first information is used to indicate a terminal device that has mutual trust with the first terminal device, and the terminal device that has mutual trust with the first terminal device includes a second terminal device. The control plane device sends a first message to a first user plane device, where the first message includes route configuration information, the route configuration information is used to configure a first transmission path, the first transmission path is used to transmit uplink or downlink data of the second terminal device via the first terminal device, and the first user plane device is configured to provide a user plane data forwarding service for the first terminal device.

According to the method described in the first aspect, when determining, based on the first information, that the first terminal device and the second terminal device are mutually trusted, the control plane device may indicate the first user plane device that provides the user plane data forwarding service for the first terminal device to establish the first transmission path for transmitting the uplink or downlink data of the second terminal device, to transmit data for the second terminal device through a plurality of transmission paths. This improves data transmission reliability of the second terminal device.

In a possible implementation of the first aspect, the control plane device may further send an authentication request message to the second terminal device via the first terminal device, where the authentication request message includes verification information, and the verification information is used to verify an identity of the second terminal device.

According to this method, validity of the identity of the second terminal device can be ensured, and data transmission security can be improved.

In a possible implementation of the first aspect, the control plane device receives an authentication response message from the first terminal device, where the authentication response message includes verification response information; and if determining, based on the verification response information, that the identity verification of the second terminal device succeeds, the control plane device determines that the uplink or downlink data of the second terminal device can be transmitted via the first terminal device.

In a possible implementation of the first aspect, if the first terminal device and the second terminal device are provided with user plane data forwarding services by different user plane devices, the control plane device may receive a first response message from the first user plane device, where the first response message includes downlink data tunnel information corresponding to a downlink data tunnel, and the downlink data tunnel is used to transmit downlink data of the second terminal device from a second user plane device to the first user plane device; the control plane device sends a second message to the second user plane device, where the second message includes the downlink data tunnel information, the second message is used to request to configure an uplink data tunnel for the second terminal device, the uplink data tunnel is used to transmit uplink data of the second terminal device from the first user plane device to the second user plane device, and the second user plane device is configured to provide a user plane data forwarding service for the second terminal device; the control plane device receives a second response message from the second user plane device, where the second response message includes uplink data tunnel information corresponding to the uplink data tunnel; and the control plane device sends an acknowledgment message to the first user plane device, where the acknowledgment message includes the uplink data tunnel information.

According to this method, a data transmission channel between the first user plane device and the second user plane device is established, to ensure that data of the second terminal device can be securely and effectively transmitted between user plane devices.

In a possible implementation of the first aspect, the downlink data tunnel information includes an Internet protocol IP address and a tunnel endpoint identifier TEID of the downlink data tunnel; and the uplink data tunnel information includes an IP address and a TEID of the uplink data tunnel.

In a possible implementation of the first aspect, the first message further includes one or both of the following: data charging information, and monitoring and quality of service policy information indicating a rule for performing charging and monitoring on user data of the second terminal device that is forwarded by the first terminal device and indicating a quality of service guarantee requirement.

In a possible implementation of the first aspect, that the control plane device obtains first information of the first terminal device includes: The control plane device receives the first information from the first terminal device; or the control plane device obtains subscription data of the first terminal device, where the subscription data includes the first information; or the control plane device receives the first information from the first user plane device.

According to a second aspect, a communication method is provided. The method is applied to forwarding data by a first terminal device to another terminal device. The method is performed by a first user plane device or a module in the first user plane device. Herein, an example in which the first user plane device is an execution body is used for description. The method includes: The first user plane device receives a first message from a control plane device, where the first message includes route configuration information, the route configuration information is used to configure a first transmission path, and the first transmission path is used to transmit uplink or downlink data of a second terminal device via the first terminal device. The first user plane device configures the first transmission path based on the route configuration information.

According to the method described in the second aspect, the first user plane device establishes, based on the route configuration information sent by the control plane device, the first transmission path for transmitting the uplink or downlink data of the second terminal device, to transmit data for the second terminal device through a plurality of transmission paths. This improves transmission reliability of the data of the second terminal device.

In a possible implementation of the second aspect, if the first terminal device and the second terminal device are provided with user plane data forwarding services by different user plane devices, that the first user plane device configures the first transmission path based on the route configuration information includes: The first user plane device establishes a downlink data tunnel, where the downlink data tunnel is used to transmit downlink data of the second terminal device from a second user plane device to the first user plane device; and the first user plane device sends a first response message to the control plane device, where the first response message includes downlink data tunnel information corresponding to the downlink data tunnel.

In a possible implementation of the second aspect, the method further includes: The first user plane device receives an acknowledgment message from the control plane device, where the acknowledgment message includes uplink data tunnel information corresponding to an uplink data tunnel, the uplink data tunnel is used to transmit uplink data of the second terminal device from the first user plane device to the second user plane device, and the second user plane device is configured to provide a user plane data forwarding service for the second terminal device.

In a possible implementation of the second aspect, the method further includes: The first user plane device receives a first packet from the second user plane device through the downlink data tunnel, where the first packet includes downlink data of the second terminal device, and destination address information in a data tunnel layer header of the first packet includes the downlink data tunnel information. The first user plane device determines, based on the downlink data tunnel information in the data tunnel layer header of the first packet, that a next hop of the first packet is the first terminal device on the first transmission path. The first user plane device sends the first packet to the first terminal device.

In a possible implementation of the second aspect, the method further includes: The first user plane device receives a second packet from the first terminal device, where a destination address in a multipath transport layer header of the second packet is an address corresponding to the second user plane device; the first user plane device determines, based on the destination address in the multipath transport layer header of the second packet, that a next hop of the second packet is the second user plane device; and the first user plane device adds the uplink data tunnel information to the second packet, and sends the second packet to the second user plane device through the uplink data tunnel.

In a possible implementation of the second aspect, the first user plane device is further configured to provide a user plane data forwarding service for the second terminal device, and the method further includes: The first user plane device receives downlink data of the second terminal device; the first user plane device encapsulates the downlink data into a third packet; and the first user plane device sends the third packet to the second terminal device through the first transmission path, and/or sends the third packet to the second terminal device through the second transmission path, where the second transmission path is a data channel that is between the second terminal device and the first user plane device and that is connected via an access network device.

In a possible implementation of the second aspect, the first user plane device is further configured to provide the user plane data forwarding service for the second terminal device, and the method further includes: The first user plane device receives a fourth packet from the second terminal device through the second transmission path, and receives a fifth packet from the first terminal device through the first transmission path, where a multipath transport layer header of the fourth packet includes a multipath transport layer sequence number, a multipath transport layer header of the fifth packet includes a multipath transport layer sequence number, the second transmission path is the data channel that is between the second terminal device and the first user plane device and that is connected via the access network device; if determining that the multipath transport layer sequence number in the fourth packet is equal to the multipath transport layer sequence number in the fifth packet, the first user plane device determines that the fourth packet and the fifth packet are same duplicate packets; and the first user plane device discards one of the fourth packet and the fifth packet, and forwards the other packet.

In a possible implementation of the second aspect, the method further includes: The first user plane device sends a detection packet to the second terminal device via the first terminal device; and if receiving an acknowledgment packet from the second terminal device, the first user plane device determines that the first transmission path is valid.

In a possible implementation of the second aspect, the method further includes: The first user plane device sends a route reachability broadcast request to the first terminal device; and the first user plane device receives a route reachability broadcast response from the first terminal device, where the route reachability broadcast response includes first information, the first information indicates a terminal device that has mutual trust with the first terminal device, and the terminal device that has mutual trust with the first terminal device includes the second terminal device.

In a possible implementation of the second aspect, the method further includes: The first user plane device sends the first information to the control plane device.

According to a third aspect, a communication method is provided. The method is applied to forwarding data by a first terminal device to another terminal device. The method is performed by the first terminal device or a module in the first terminal device. Herein, an example in which the first terminal device is an execution body is used for description. The method includes: The first terminal device obtains first information, where the first information includes identification information of a terminal device that has mutual trust with the first terminal device, and the terminal device that has mutual trust with the first terminal device includes a second terminal device. The first terminal device sends the first information to a control plane device, where the first information indicates to establish a first transmission path, and the first transmission path is used to transmit uplink or downlink data of the second terminal device via the first terminal device.

According to the method described in the third aspect, the first terminal device sends the first information to the control plane device, so that when determining, based on the first information, that the first terminal device and the second terminal device are mutually trusted, the control plane device may indicate a first user plane device that provides a user plane data forwarding service for the first terminal device to establish the first transmission path for transmitting the uplink or downlink data of the second terminal device, to transmit data for the second terminal device through a plurality of transmission paths. This improves data transmission reliability of the second terminal device.

In a possible implementation of the third aspect, the method further includes: The first terminal device receives an authentication request message from the control plane device, where the authentication request message includes verification information, and the verification information is used to verify an identity of the second terminal device; the first terminal device sends the authentication request message to the second terminal device; the first terminal device receives an authentication response message from the second terminal device, where the authentication response message includes verification response information; and the first terminal device sends the authentication response message to the control plane device.

In a possible implementation of the third aspect, the method further includes: The first terminal device receives a route reachability broadcast request sent by the first user plane device, where the route reachability broadcast request is used to request the first information; and the first terminal device sends a route reachability broadcast response to the first user plane device based on the route reachability broadcast request, where the route reachability broadcast response includes the first information.

In a possible implementation of the third aspect, the method further includes: The first terminal device receives a first packet from the first user plane device, where the first packet includes downlink data of the second terminal device, and a destination address in a multipath transport layer header of the first packet is an address corresponding to the second terminal device; and the first terminal device sends the first packet to the second terminal device.

In a possible implementation of the third aspect, the method further includes: The first terminal device receives a second packet from the second terminal device, where the second packet includes uplink data of the second terminal device, and a destination address in a multipath transport layer header of the second packet is an address corresponding to the second user plane device; the first terminal device determines, based on the destination address in the multipath transport layer header of the second packet, that a next hop of the second packet is the first user plane device; and the first terminal device sends the second packet to the first user plane device.

In a possible implementation of the third aspect, that the first terminal device obtains first information includes: The first terminal device obtains the first information from subscription data of the first terminal; or the first terminal device detects a terminal device surrounding the first terminal device, and determines the first information based on detected terminal devices that can be mutually trusted.

According to a fourth aspect, a communication method is provided. The method is applied to forwarding data by a first terminal device to another terminal device. The method is performed by a second user plane device or a module in the second user plane device. Herein, an example in which the second user plane device is an execution body is used for description. The method includes: The second user plane device receives a second message from a control plane device, where the second message includes downlink data tunnel information, the second message is used to request to configure an uplink data tunnel for a second terminal device, the uplink data tunnel is used to transmit uplink data of the second terminal device from a first user plane device to the second user plane device, and a downlink data tunnel corresponding to the downlink data tunnel information is used to transmit downlink data of the second terminal device from the second user plane device to the first user plane device. The second user plane device sends a second response message to the control plane device, where the second response message includes uplink data tunnel information corresponding to the uplink data tunnel.

In a possible implementation of the fourth aspect, the method further includes: The second user plane device receives downlink data of the second terminal device; the second user plane device encapsulates the downlink data into a first packet, where the first packet includes a multipath transport layer header and the downlink data tunnel information, the multipath transport layer header includes a multipath transport layer sequence number corresponding to the downlink data, and a destination address in the multipath transport layer header is an address corresponding to the second terminal device; the second user plane device sends the first packet to the second terminal device, and/or sends the first packet to the first user plane device through the downlink data tunnel, where the first user plane device is a user plane device serving the first terminal device, and the first terminal device and the second terminal device are mutually trusted.

In a possible implementation of the fourth aspect, the method further includes: The second user plane device receives a sixth packet from the second terminal device, and receives a second packet from the first user plane device through the uplink data tunnel, where a multipath transport layer header of the sixth packet includes a multipath transport layer sequence number, and a multipath transport layer header of the second packet includes a multipath transport layer sequence number; if determining that the multipath transport layer sequence number in the second packet is equal to the multipath transport layer sequence number in the sixth packet, the second user plane device determines that the second packet and the sixth packet are same duplicate packets; and the second user plane device discards one of the second packet and the sixth packet, and forwards the other packet.

According to a fifth aspect, this application further provides a communication apparatus. The communication apparatus can implement any method provided in any one of the first aspect to the fourth aspect. The communication apparatus may be implemented by hardware, or may be implemented by hardware by executing corresponding software. The hardware or the software includes one or more units or modules corresponding to the foregoing function.

In a possible implementation, the communication apparatus includes a processor, and the processor is configured to support the communication apparatus in performing a corresponding function in the foregoing method. The communication apparatus may further include a memory. The memory may be coupled to the processor, and the memory stores program instructions and data that are necessary for the communication apparatus. Optionally, the communication apparatus further includes a communication interface. The communication interface is configured to support communication between the communication apparatus and another device.

In a possible implementation, the communication apparatus includes corresponding function units, configured to implement the steps in the foregoing method. The function may be implemented by hardware, or may be implemented by hardware by executing corresponding software. The hardware or the software includes one or more units corresponding to the foregoing function.

In a possible implementation, a structure of the communication apparatus includes a processing unit and a communication unit. The units may perform corresponding functions in the foregoing method example. For details, refer to the descriptions in the method provided in any one of the first aspect to the fourth aspect. Details are not described herein again.

According to a sixth aspect, this application provides a chip, including a processor. The processor is coupled to a memory, and is configured to execute a computer program or instructions stored in the memory. When the processor executes the computer program or the instructions, the method in any one of the possible implementations of the first aspect to the fourth aspect is implemented.

According to a seventh aspect, this application provides a communication apparatus. The communication apparatus includes a processor, and when executing a computer program or instructions in a memory, the processor implements the method in any one of the possible implementations of any one of the first aspect to the fourth aspect.

According to an eighth aspect, this application provides a communication apparatus. The communication apparatus includes a processor, a memory, and a communication interface. The communication interface is configured to receive a signal or send a signal. The memory is configured to store a computer program or instructions. The processor is configured to invoke the computer program or the instructions from the memory to perform the method in any one of the possible implementations of any one of the first aspect to the fourth aspect. Alternatively, the processor is configured to invoke the computer program or the instructions from the memory to perform the method in any one of the possible implementations of any one of the first aspect to the fourth aspect.

According to a ninth aspect, a computer-readable storage medium is provided. The computer-readable storage medium is configured to store a computer program, and the computer program includes instructions used to perform the method in any one of the possible implementations of any one of the first aspect to the fourth aspect.

According to a tenth aspect, a computer program product is provided. The computer program product includes computer program code, and when the computer program code is run on a computer, the computer is enabled to implement the method in any one of the possible implementations of any one of the first aspect to the fourth aspect.

According to an eleventh aspect, a communication apparatus is provided. The communication apparatus includes a functional module configured to implement the method in any one of the first aspect or the possible implementations of the first aspect.

According to a twelfth aspect, a communication apparatus is provided. The communication apparatus includes a functional module configured to implement the method in any one of the second aspect or the possible implementations of the second aspect.

According to a thirteenth aspect, a communication apparatus is provided. The communication apparatus includes a functional module configured to implement the method in any one of the third aspect or the possible implementations of the third aspect.

According to a fourteenth aspect, a communication apparatus is provided. The communication apparatus includes a functional module configured to implement the method in any one of the fourth aspect or the possible implementations of the fourth aspect.

According to a fifteenth aspect, a communication system is provided. The system includes the apparatus according to the eleventh aspect, the apparatus according to the twelfth aspect, and the apparatus according to the thirteenth aspect; or the system includes the apparatus according to the eleventh aspect, the apparatus according to the twelfth aspect, the apparatus according to the thirteenth aspect, and the apparatus according to the fourteenth aspect.

DESCRIPTION OF EMBODIMENTS

The following further describes in detail embodiments of this application with reference to the accompanying drawings.

The technical solutions in embodiments of this application may be applied to various mobile communication systems, for example, a 4G mobile communication system, a 5G mobile communication system, and a future mobile communication system. The 5G mobile communication system includes but is not limited to a new radio (NR) system. The 4G mobile communication system includes but is not limited to a long term evolution (LTE) system, an LTE frequency division duplex (FDD) system, an LTE time division duplex (TDD) system, and the like. This is not limited herein.

Figure 1:
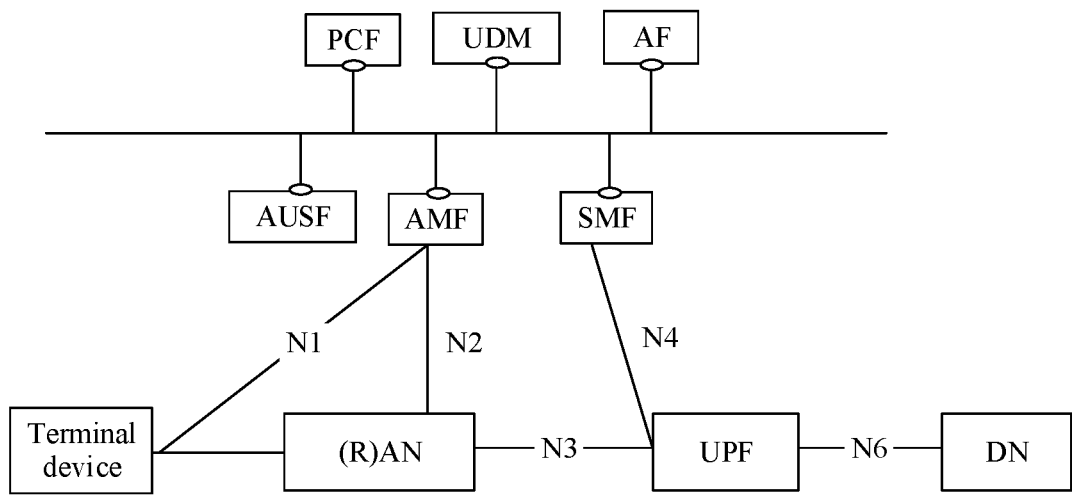
FIG. 1 is a schematic architectural diagram of a mobile communication system applicable to an embodiment of this application.

FIG. 1 is an example of a schematic architectural diagram of a mobile communication system applicable to an embodiment of this application. As shown in FIG. 1, in a 5G system architecture, a terminal device may communicate with a core network via an access network device. The terminal device may be user equipment (UE), an access terminal, a subscriber unit, a subscriber station, a mobile station, a remote station, a remote terminal, a mobile device, a user terminal, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or the like. For ease of description, FIG. 1 shows an example of only one terminal device. In an actual network, a plurality of terminal devices may coexist, and details are not described herein.

Access network (AN) device: The access network device may also be referred to as a radio access network (RAN) device, and is collectively referred to as an access network device below. The access network device is mainly responsible for providing a wireless connection for the terminal device, ensuring reliable transmission of uplink and downlink data of the terminal device, and so on. The access network device may be a next-generation base station (gNB), an evolved NodeB (eNB), or the like. When the access network device is a gNB, the access network device may include a central unit (CU) and a distributed unit (DU).

Session management function (SMF) network element: The network element may select an appropriate user plane function (UPF) network element for the terminal device based on location information of the terminal device.

Main functions of the UPF network element include packet routing and forwarding, quality of service (QoS) processing of user plane data, and the like.

Main functions of an access and mobility management (AMF) network element include an access management function and the like.

A policy control function (PCF) network element is mainly responsible for managing functions such as user, session, and QoS flow processing policies.

Main functions of an authentication server function (AUSF) network element include user authentication and the like.

A user data management (UDM) network element is mainly responsible for managing subscription data of a user and so on.

A data network (DN) may provide a network service for a terminal device.

FIG. 1 is merely an example, and may further include another network element, for example, an application function (AF) network element. Examples are not described one by one herein.

FIG. 1 further shows interfaces between the network elements, for example, an N2 interface between the access network device and the AMF network element, and an N3 interface between the access network device and the UPF network element. Details are not described herein.

Figure 2:
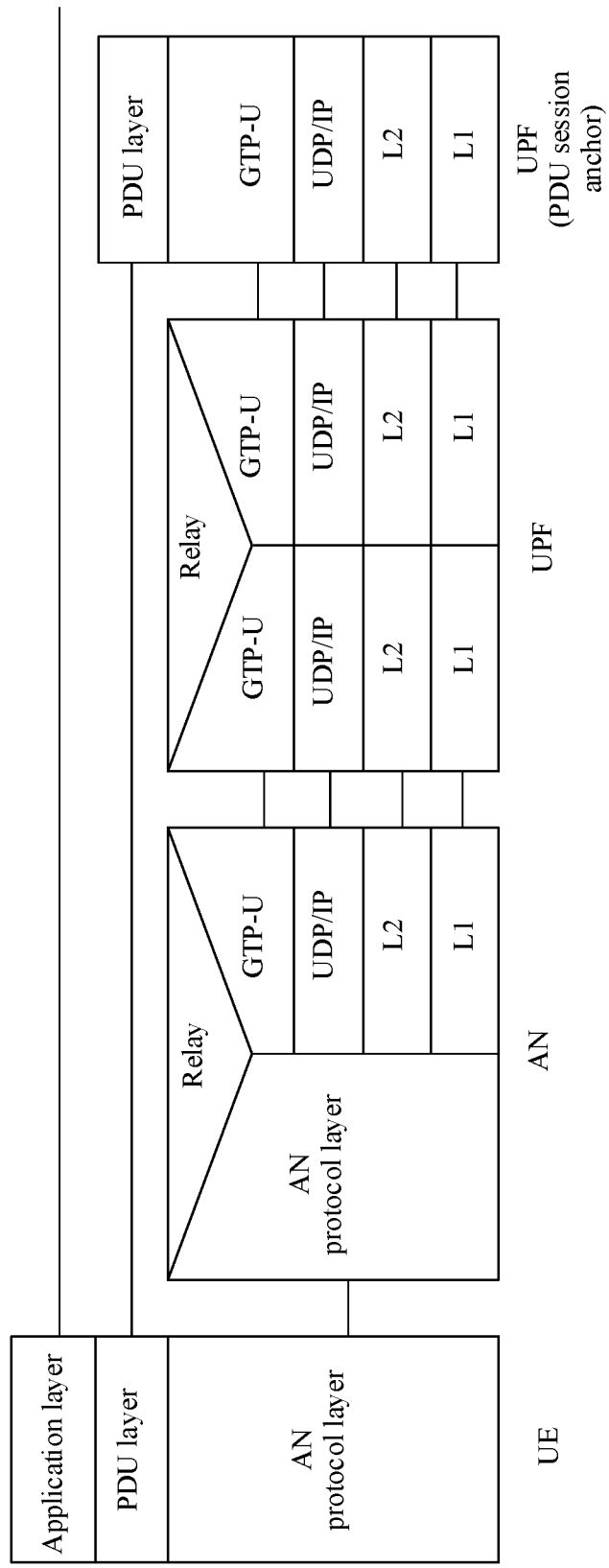
FIG. 2 is a schematic diagram of a user plane protocol stack according to an embodiment of this application.

A user plane protocol stack corresponding to the network shown in FIG. 1 may be shown in FIG. 2. FIG. 2 shows protocol layers such as an application layer, a protocol data unit (PDU) layer, a general packet radio service (GPRS) tunnelling protocol user plane (GTP-U) layer, a user datagram protocol (UDP) layer/an Internet protocol (IP) layer, an L2 layer, and an L1 layer. For specific meanings, refer to descriptions in the conventional technology. Details are not described herein.

Before performing a data service, the terminal device first establishes a PDU session, that is, establishes a connection used to send and receive data. Based on a service requirement, the connection may be an IP connection, and an IP address is allocated by the UPF network element, or the connection may be another non-IP connection. For example, a media access control (MAC) address is bound. The data connection is located at the PDU layer shown in the foregoing figure, and is an end-to-end protocol layer from the terminal device to a core network UPF. The data connection is formed by interconnection of several different protocol stacks from the terminal device to the AN and from the AN to the UPF. After the terminal device successfully establishes the PDU session, an application connected to the terminal device may send and receive data by using the established connection, and exchange data with a communication peer end.

Currently, in addition to a mobile network wireless access capability, the terminal device may further have another wireless short-range communication capability, for example, have short-range communication capabilities such as a Bluetooth capability, a wireless fidelity (Wi-Fi) capability, and a device-to-device (D2D) capability. Based on these short-range communication technologies, adjacent terminal devices within a specific range may form a local area network, and may communicate with each other.

In view of this, in embodiments of this application, when there is a mutual trust relationship between terminal devices, the terminal device may not only perform data communication by using a data connection established between the terminal device and a network, but also perform data communication by using a data connection established between another adjacent terminal device and a network. In short, based on a short-range communication technology between terminal devices, it is equivalent to establishment of a plurality of data paths or connections between a terminal device and a mobile network. In addition, a new protocol layer is added between the terminal device and the UPF network element, to implement multipath data transmission, including sorting, deduplication, offloading and aggregation of data packets, so that redundant multipath transmission of data can be implemented to improve communication reliability, or offloading and aggregation can be implemented to increase a rate and a bandwidth. The protocol layer may be referred to as a multipath transport layer, or may have another name. This is not limited herein.

According to the solutions provided in this application, the terminal device does not need to have a multi-connection capability, and a problem that reliable communication cannot be implemented when the terminal device is located in an area with poor network signal quality can be resolved. It should be noted that the short-range communication technology is one of optional manners of providing communication between terminal devices. A specific technology is not limited in this application. For example, another wired connection or wireless relay manner may be used. The following provides detailed descriptions.

The network architecture and the service scenario described in embodiments of this application are intended to describe the technical solutions in embodiments of this application more clearly, and do not constitute a limitation on the technical solutions provided in embodiments of this application. A person of ordinary skill in the art may know that: With evolution of the network architecture and emergence of new service scenarios, the technical solutions provided in embodiments of this application are also applicable to similar technical problems.

Figure 3:
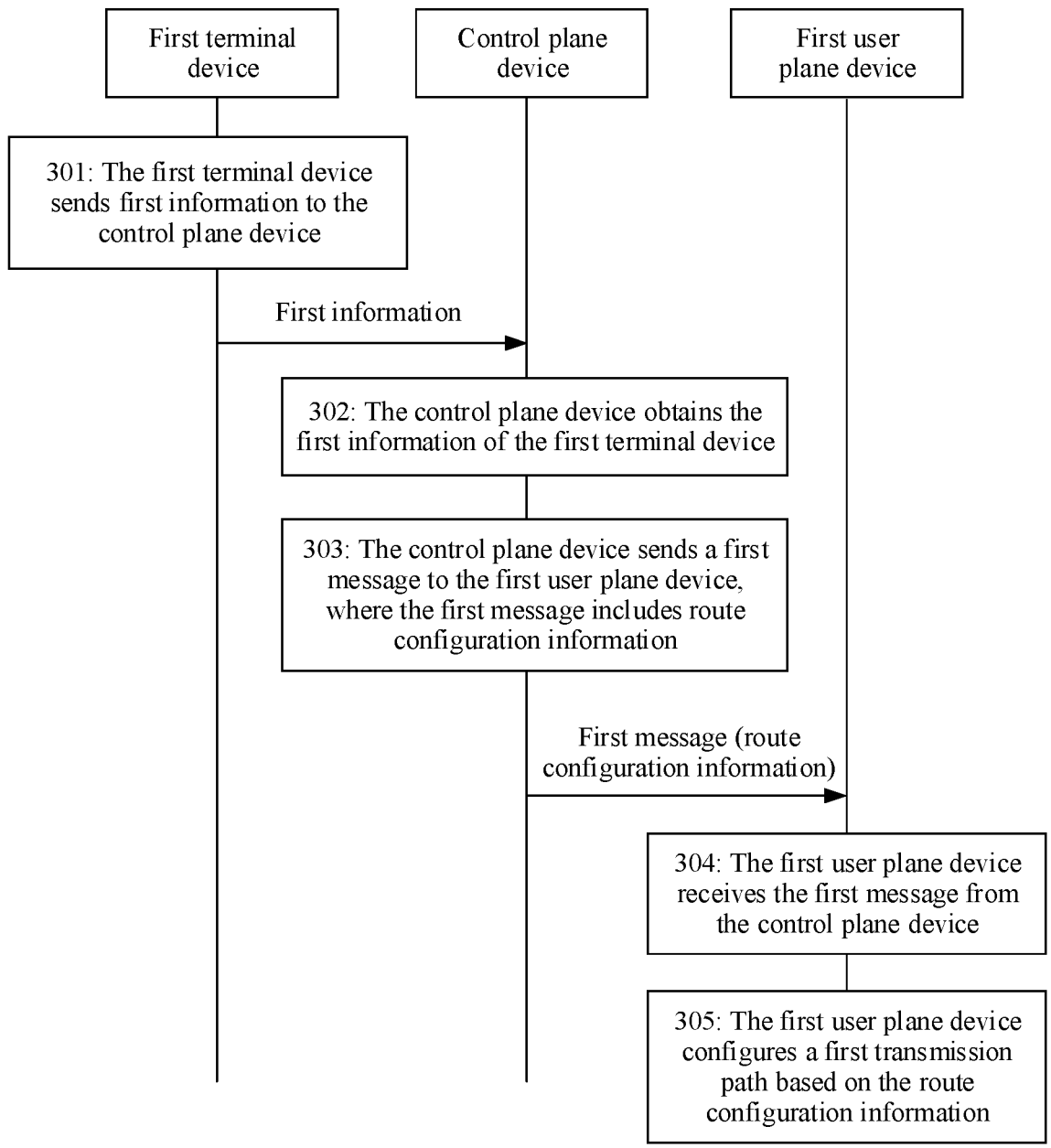
FIG. 3 is a schematic flowchart of a communication method according to an embodiment of this application.

With reference to the foregoing descriptions, FIG. 3 is a schematic flowchart of a communication method according to an embodiment of this application. Refer to FIG. 3. The method includes the following steps.

Optionally, step 301: A first terminal device sends first information to a control plane device.

The first information includes identification information of a terminal device that has mutual trust with the first terminal device, or the first information indicates a terminal device that has mutual trust with the first terminal device. Alternatively, when the first terminal device sends the first information to the control plane device, the first information indicates to establish a first transmission path.

In a possible implementation, when a first user plane device provides a user plane data forwarding service for the first terminal device and a second terminal device, the first transmission path may include the first user plane device, the first terminal device, a first access network device, and the second terminal device. The first access network device is a device that establishes a wireless connection to the first terminal device and provides an access service for the first terminal device.

In this implementation, when downlink data is transmitted to the second terminal device, on the first transmission path, nodes that the downlink data passes through in a transmission process are sequentially the first user plane device, the first terminal device, the first access network device, and the second terminal device. When the second terminal device transmits uplink data, on the first transmission path, nodes that the uplink data passes through in a transmission process are sequentially the second terminal device, the first terminal device, the first access network device, and the first user plane device.

In another possible implementation, when a first user plane device provides a user plane data forwarding service for the first terminal device, and a second user plane device provides a user plane data forwarding service for the second terminal device, the first transmission path may include the second user plane device, the first user plane device, the first terminal device, a first access network device, and the second terminal device.

In this implementation, when downlink data is transmitted to the second terminal device, on the first transmission path, nodes that the downlink data passes through in a transmission process are sequentially the second user plane device, the first user plane device, the first terminal device, the first access network device, and the second terminal device. When the second terminal device transmits uplink data, on the first transmission path, nodes that the uplink data passes through in a transmission process are sequentially the second terminal device, the first terminal device, the first access network device, the first user plane device, and the second user plane device.

The first information may include the identification information of the terminal device that has mutual trust with the first terminal device. When the terminal device that has mutual trust with the first terminal device includes the second terminal device, the identification information of the terminal device that has mutual trust with the first terminal device includes identification information of the second terminal device. It should be noted that "mutual trust" herein indicates that the first terminal device may establish a connection relationship with another terminal device (for example, the second terminal device), and transmit uplink or downlink data to the other terminal device by using a connection between the first terminal device and a network, or the like. The first information may also be referred to as "path reachability information", "trust and mutual-aid information", or the like. A specific name of the first information is not limited in this application.

The control plane device may be a device such as an AMF network element or an SMF network element. It should be noted that the first terminal device may not directly communicate with the control plane device, and data transmitted between the first terminal device and the control plane device needs to be forwarded via a device such as a RAN.

Optionally, the first information may indicate to establish the first transmission path, and the first transmission path is used to transmit uplink or downlink data of the second terminal device via the first terminal device.

In a possible implementation, the first information may directly indicate to establish the first transmission path. For example, the first information may include at least one bit, and when a value of the at least one bit is a preset value, the at least one bit indicates to establish the first transmission path.

In another possible implementation, the first information may indirectly indicate to establish the first transmission path. For example, after obtaining the first information, the control plane device may determine that the first transmission path needs to be established.

Step 302: The control plane device obtains the first information of the first terminal device.

Step 303: The control plane device sends a first message to the first user plane device, where the first message includes route configuration information.

The route configuration information is used to configure the first transmission path. The first transmission path is used to transmit the uplink or downlink data of the second terminal device via the first terminal device. The first user plane device is configured to provide the user plane data forwarding service for the first terminal device. For example, the first user plane device may be a device such as a UPF network element that provides the user plane data forwarding service for the first terminal device.

It should be noted that the second terminal device further has a corresponding second transmission path, and the second transmission path is a direct data transmission path between the network and the second terminal device. Assuming that the second user plane device provides the user plane data forwarding service for the second terminal device, the second transmission path may be a data channel that is between the second terminal device and the second user plane device and that is connected via an access network device. On the second transmission path, the second user plane device may transmit downlink data to the second terminal device via the access network device connected to the second terminal device, and may receive uplink data that is transmitted by the second terminal device via the access network device.

Certainly, the foregoing is merely an example. Assuming that the first user plane device provides the user plane data forwarding service for the second terminal device, the second transmission path may be a data channel that is between the second terminal device and the first user plane device and that is connected via the access network device.

The route configuration information may include information such as a routing and forwarding rule. The routing and forwarding rule may indicate the first user plane device to forward downlink data of the second terminal device to the second terminal device via the first terminal device, and forward, to a network side, uplink data of the second terminal device that is sent by the first terminal device.

The route configuration information may further include other information, and details are not described herein.

Step 304: The first user plane device receives the first message from the control plane device.

Step 305: The first user plane device configures the first transmission path based on the route configuration information.

According to the foregoing procedure, configuration of the first transmission path including the first user plane device, the first terminal device, and the second terminal device can be completed, so that the network side may transmit the uplink data and the downlink data of the second terminal device through the first transmission path.

In step 301, the first terminal device may obtain the first information in a plurality of ways.

In a first possible implementation, the first terminal device may obtain the first information based on subscription data of the first terminal device. For example, when the first terminal device subscribes to an operator, the operator configures, by using subscription data, a list or an inventory including the first terminal device. A terminal device in the list or the inventory and the first terminal device are mutually trusted. The list and the inventory are both described as inventories below, and the first terminal device may use the inventory as the first information.

The terminal devices in the inventory belong to a same trust and mutual-aid group. For example, the inventory may be {UE1, UE2, UE3, . . . , UEn}. During specific implementation, the inventory may be an inventory including identities of related terminal devices, for example, one or a combination of a plurality of an international mobile subscriber identity (IMSI), an international mobile equipment identity (IMEI), or an IP address. Terminal devices that belong to a same inventory may mutually use a network connection of another terminal device to send and receive data. Correspondingly, the terminal devices that belong to the same inventory may share data traffic, or perform statistics collection and charging on traffic of a source terminal device that sends data. For configuration in this manner, it usually needs to be ensured that these terminal devices are located in a same geographical area, and a connection may be established between each other through short-range communication or in another communication manner.

In a second possible implementation, the first terminal device may detect terminal devices surrounding the first terminal device, and determine an inventory based on detected terminal devices that can be mutually trusted, where the inventory may include identification information of a terminal device that has mutual trust with the first terminal device, and the first terminal device uses the inventory as the first information.

For example, the first terminal device may detect surrounding terminal devices by using a short-range communication technology such as Bluetooth, Wi-Fi, or D2D, or another technology such as a wired connection or a wireless relay, to obtain surrounding terminal devices that can be mutually trusted. The surrounding terminal device detected by the first terminal device may be a surrounding terminal device that is directly reachable through one hop, or may be a terminal device that is reachable after a plurality of hops. A specific technology used by the first terminal device to implement network topology detection and discovery is not limited in this application. Each time the first terminal device detects a terminal device that can be mutually trusted, the first terminal device may store an identity of the terminal device in an inventory, and the first terminal device may use the inventory as the first information.

After determining the first information, the first terminal device may send the first information to the control plane device in a plurality of ways.

Specifically, the first terminal device may include the first information in a registration request message in a registration procedure. The first terminal device may alternatively include the first information in a location update request message in a location update procedure. The first terminal device may alternatively include the first information in a PDU session establishment request message in a PDU session establishment procedure.

In step 302, the control plane device may receive the first information from the first terminal device; the control plane device may obtain subscription data that is of the first terminal device and that includes the first information, and obtain the first information by using the subscription data; or the control plane device may receive the first information from the first user plane device. The foregoing is merely an example. The control plane device may alternatively obtain the first information in another manner. This is not limited in this embodiment of this application.

When the control plane device receives the first information from the first terminal device, the control plane device may verify whether the first information reported by the first terminal device is consistent with corresponding information in subscription data stored on the network side. If the control plane device obtains the first information in the registration/location update procedure, and has not stored the subscription data of the first terminal device, the control plane device may obtain the subscription data of the first terminal device from a UDM network element, and then check whether the first information is consistent with corresponding information in the obtained subscription data. If the control plane device obtains the first information in the PDU session establishment procedure, and the control plane device has stored the subscription data of the first terminal device, the control plane device may directly check whether the first information is consistent with corresponding information in the obtained subscription data.

If the control plane device determines that the first information is inconsistent with the corresponding information in the subscription data stored on the network side, the control plane device considers that the first information is invalid, and may no longer perform a subsequent procedure.

It should be noted that the corresponding information included in the subscription data may be an inventory of terminal devices that have mutual trust with the first terminal device. For example, a specific inventory may be {UE1, UE2, UE3, . . . , UEn}. The inventory may be an inventory including identities of related terminal devices.

Optionally, the control plane device may further determine, by querying the subscription data of the first terminal device, whether the first terminal device is allowed to forward data for another terminal device, and determine whether the first terminal device is allowed to send and receive data by using a network connection of the other terminal device. If it is determined that the first terminal device is not allowed to forward the data for the other terminal device, or it is determined that the first terminal device is not allowed to send or receive data by using the network connection of the other terminal device, a subsequent procedure may not be performed.

The control plane device may further check subscription data of each of the terminal devices that have mutual trust with the first terminal device, to determine whether each terminal device is allowed to send and receive data by using a network connection of another terminal device. If there is one terminal device, which is assumed to be referred to as a third terminal device, and the control plane device determines that the third terminal device is not allowed to send or receive data by using a network connection of another terminal device, the control plane device no longer establishes, for the third terminal device, a transmission path for transmitting data via the first terminal device.

It should be noted that the control plane device may obtain subscription data of the other terminal device via the UDM network element. A specific process is not described again.

Optionally, if the control plane device obtains the first information in the PDU session establishment procedure, when selecting a UPF network element for the first terminal device, the control plane device may further allocate, to the first terminal device, a UPF network element corresponding to a terminal device that has mutual trust with the first terminal device.

For example, the second terminal device and the first terminal device are mutually trusted. To ensure that all mutually trusted terminal devices access a same UPF network element, when selecting a UPF network element, the control plane device may determine, based on an identity of the second terminal device, a UPF network element that serves the second terminal device, to allocate the UPF network element to the first terminal device. Alternatively, the control plane device may allocate, to the first terminal device based on UPF network element information included in subscription data of the second terminal device, a UPF network element corresponding to the UPF network element information. Alternatively, the control plane device may allocate, to the first terminal device based on an IP address of the second terminal device, a UPF network element responsible for serving an IP address segment of the IP address.

Figure 4:
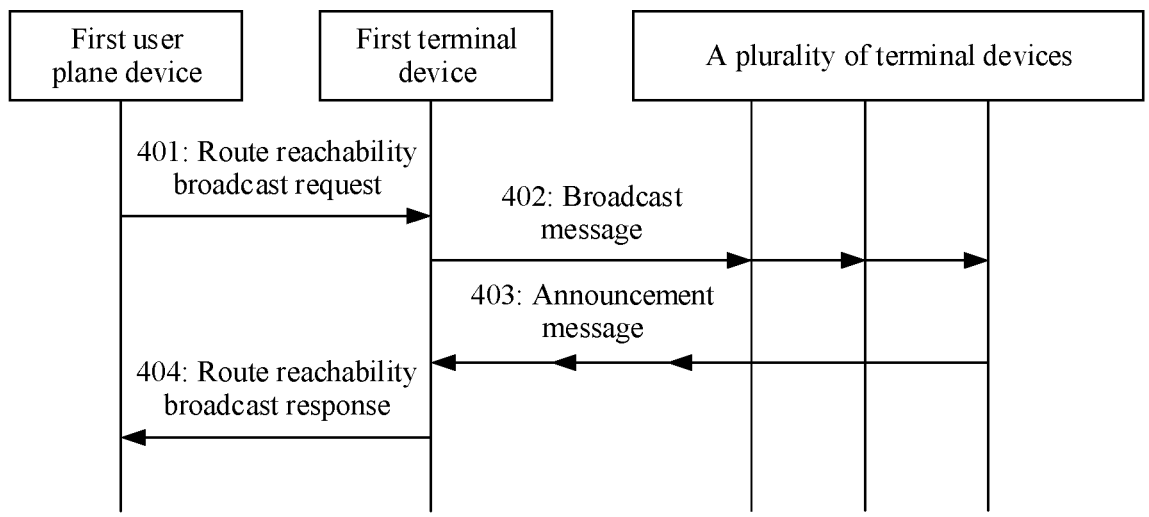
FIG. 4 is a schematic flowchart of actively detecting a terminal device that has mutual trust with a first terminal device according to an embodiment of this application.

In this embodiment of this application, the first information obtained by the control plane device may alternatively be from the first user plane device. When the first information is from the first user plane device, the first user plane device may actively perform detection to obtain a terminal device that has mutual trust with the first terminal device, to obtain the first information. Specifically, as shown in FIG. 4, the following process may be included:

Step 401: The first user plane device sends a route reachability broadcast request to the first terminal device.

The route reachability broadcast request may be used to request the first information; or the route reachability broadcast request may be used to request to detect a terminal device that can have mutual trust with the first terminal device, and forward a detection result to the first user plane device.

The route reachability broadcast request may carry one or both of a data network name (DNN) of a PDU session of the first terminal device and an operator network identifier. The operator network identifier may be a public land mobile network (PLMN) or the like. The route reachability broadcast request may further carry other information. This is not limited herein.

Step 402: The first terminal device sends a broadcast message based on the route reachability broadcast request.

The broadcast message may also have another name, for example, a route reachability broadcast message. The broadcast message may indicate that the first terminal device has a capability of forwarding downlink data to another terminal device and a capability of forwarding uplink data to another terminal device by using a mobile communication network.

The first terminal device may detect, based on the route reachability broadcast request, terminal devices that can be mutually trusted. Specifically, the first terminal device may send the broadcast message by using any communication technology supported by the first terminal device. For example, the first terminal device may send the broadcast message through Bluetooth, Wi-Fi, or D2D, or in another manner, or may send the broadcast message by using a wireless relay or a wired connection or in another manner. The broadcast message may include one or both of a DNN and a PLMN, and may further include a user identity of the first terminal device, for example, an IMSI of the first terminal device and an IP address corresponding to a PDU session.

Step 403: The first terminal device receives at least one announcement message.

The announcement message may also have another name, for example, a route reachability announcement message.

An example in which another terminal device is the second terminal device is used for description. When receiving the broadcast message, if determining to forward the uplink data and the downlink data of the second terminal device via the first terminal device, the second terminal device may send the announcement message to the first terminal device.

The announcement message may include an identity, such as an IMSI, an IMEI, or an IP address, of the terminal device that sends the announcement message.

Optionally, the announcement message may further include a token that is provided for a network to verify authenticity of an identity of the terminal device. For example, the token may be a signature generated by using a private key of the terminal device that sends the announcement message.

Step 404: The first terminal device sends a route reachability broadcast response to the first user plane device.

When the route reachability broadcast request is used to request the first information, the route reachability broadcast response may include the first information.

Alternatively, when the route reachability broadcast request is used to request the detection result, the route reachability broadcast response may include the detection result, and may specifically include the at least one announcement message received by the first terminal device.

The first user plane device may send the first information to the control plane device.

The first user plane device may determine the first information based on the at least one announcement message. Specifically, the first user plane device may determine, based on an identity included in each of the at least one announcement message, a terminal device that has mutual trust with the first terminal device, to determine the first information.

Optionally, for any one of the at least one announcement message, if the announcement message includes a token, the first user plane device may further verify identity authenticity of the corresponding terminal device by using the token. A specific verification process is not described. If the announcement message does not include a token, the first user plane device may alternatively verify, in another manner, identity authenticity of the terminal device that sends the announcement message. Details are not described.

Figure 5:
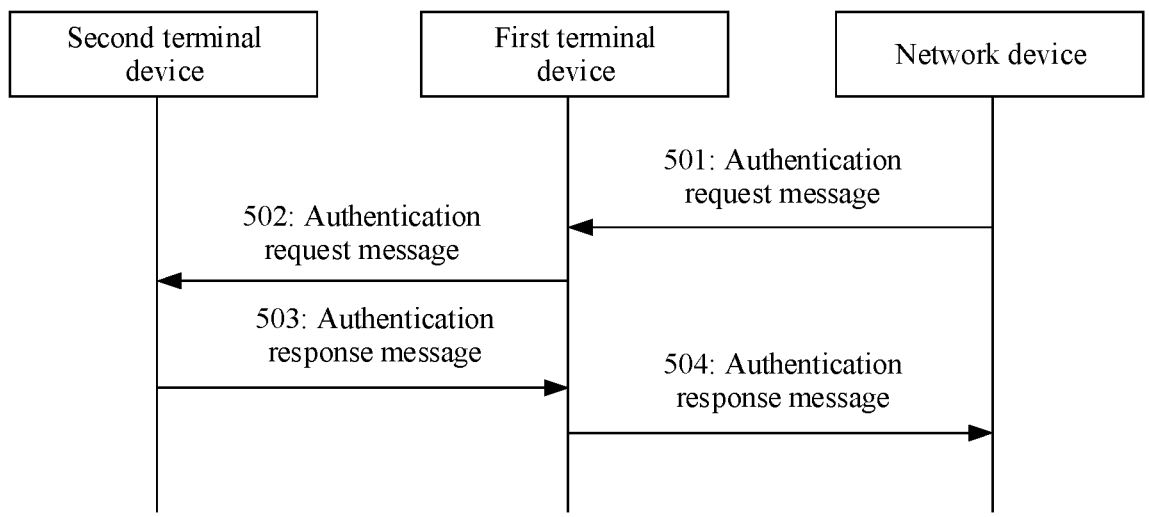
FIG. 5 is a schematic flowchart of verifying path reachability according to an embodiment of this application.

Optionally, to avoid a case such as being spoofed by the terminal device, after the control plane device obtains the first information, the network side may further verify whether path reachability between the first terminal device and a terminal device that has mutual trust with the first terminal device is valid, that is, verify whether a path from the first terminal device to the terminal device that has mutual trust with the first terminal device is valid. For example, the second terminal device is used as an example. As shown in FIG. 5, the network side may initiate an authentication procedure to verify path reachability between the second terminal device and the first terminal device. Specifically, as shown in FIG. 5, the following steps may be included:

Step 501: A network device sends an authentication request message to the first terminal device.

The network device may be the control plane device, for example, an AMF network element or an SMF network element. Alternatively, the network device may be a user plane device, for example, a UPF network element. Alternatively, the network device may be another network element, for example, an AUSF network element.

The authentication request message carries the identity of the second terminal device, indicating that an authentication target object is the second terminal device. The authentication request message may further carry a challenge problem. Specific content of the challenge problem is not limited in this application. The authentication request message may alternatively carry other information that requires the second terminal device to prove the identity. In this application, the challenge problem is used as an example for description.

Step 502: The first terminal device determines, based on the identity in the received authentication request message, information such as a communication interface and a port that are used to communicate with the second terminal device corresponding to the identity, and forwards the authentication request message to the second terminal device.

Step 503: The second terminal device generates a challenge response based on a security key of the second terminal device and the challenge problem in the authentication request message, and sends an authentication response message including a challenge response to the first terminal device.

Step 504: The first terminal device forwards the authentication response message to the network device based on the received authentication response message.

The network device checks the challenge response carried in the authentication response message to determine whether authentication succeeds. If the challenge response is correct, it indicates that the challenge response is indeed from the second terminal device. Therefore, the network device may communicate with the second terminal device by using a network connection of the first terminal device, that is, path reachability of the second terminal device via the first terminal device is effective. Compared with a PDU data connection between the network and the second terminal device, that is, a direct reachable path of the second terminal device, the foregoing path from the first terminal device to the second terminal device may be marked by the network as an indirect reachable path to the second terminal device.

It should be noted that the foregoing procedure may be completed by a control plane of a core network by interacting with the first terminal device by using control plane signaling. Alternatively, when a PDU session has been established between a core network and the first terminal device, the foregoing authentication interaction process may be completed on a user plane. The foregoing authentication process is used to describe a process of authenticating a user identity, and a method using a symmetric key or asymmetric public and private keys may be used.

To verify whether path reachability between the first terminal device and a terminal device that has mutual trust with the first terminal device is valid, which is not limited to the foregoing method, the network side may further directly send a dedicated detection packet to the second terminal device on the user plane, to determine whether the second terminal device is reachable. For example, this may be implemented by using an Internet packet detector (packet internet groper, ping) operation.

For example, that the first terminal device and the second terminal device are mutually trusted is used as an example. The ping operation may include the following procedure:

Step 1: The first user plane device sends a detection packet to the second terminal device via the first terminal device.

Specifically, the first user plane device sends the detection packet to the first terminal device, where a destination address of the detection packet is an address of the second terminal device. After receiving the detection packet, the first terminal device may forward the detection packet to the second terminal device.

Step 2: If receiving an acknowledgment packet from the second terminal device, the first user plane device determines whether path reachability between the first terminal device and the second terminal device is valid.

If the first terminal device can forward the detection packet to the second terminal device, after receiving the detection packet, the second terminal device sends, to the first terminal device, an acknowledgment packet indicating that the detection packet is successfully received. The first terminal device forwards the acknowledgment packet to the first user plane device. The first user plane device receives the acknowledgment packet, to determine that the path reachability is valid.

If the first terminal device cannot forward the detection packet to the second terminal device, the first user plane device cannot receive the acknowledgment packet, and therefore may determine that the path reachability is invalid.

Assuming that there are a plurality of terminal devices that have mutual trust with the first terminal device, for each terminal device that has mutual trust with the first terminal device, the network side repeats the foregoing process, to verify path reachability between each terminal device and the first terminal device.

Figure 6:
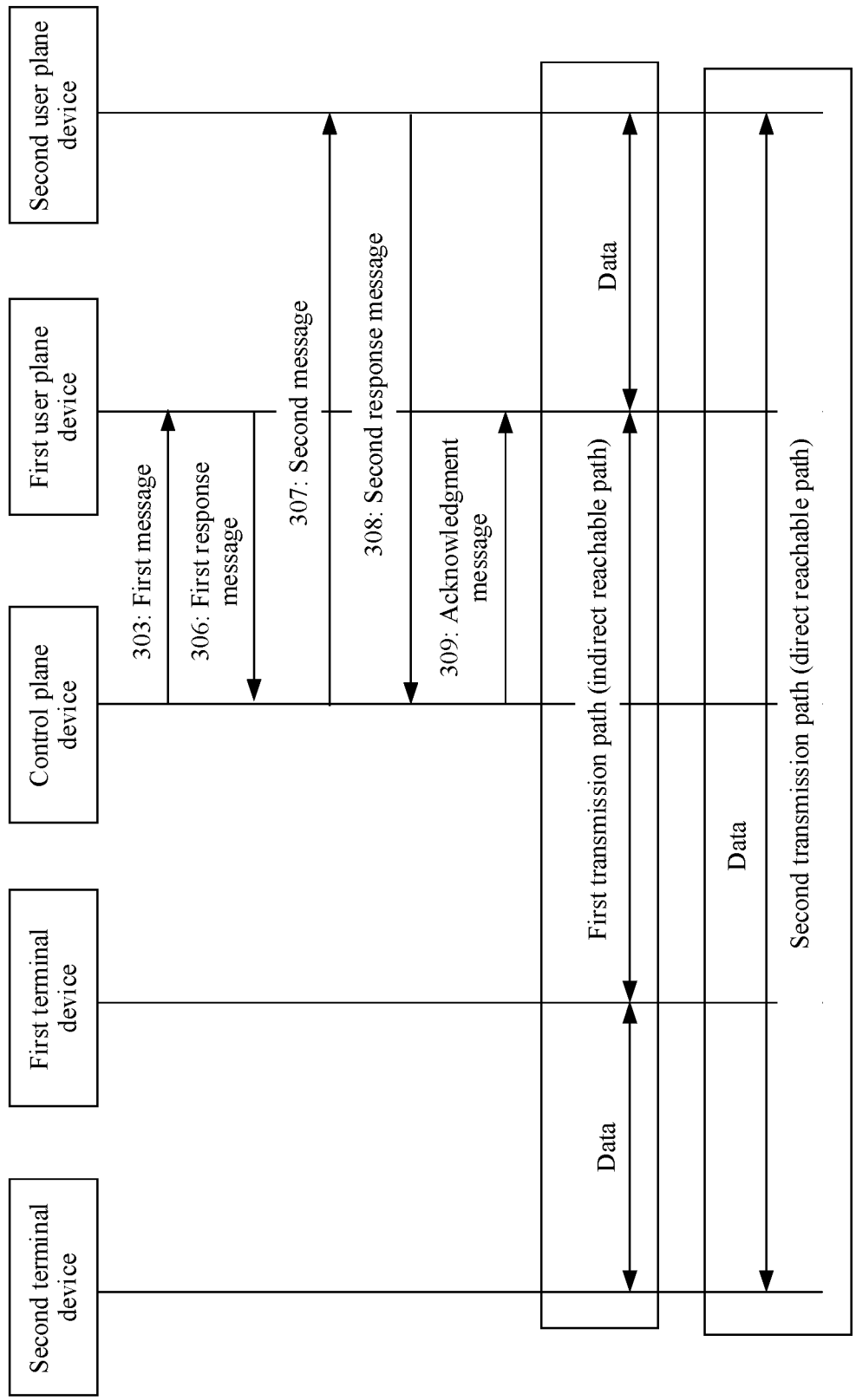
FIG. 6 is a schematic flowchart of establishing a forwarding channel according to an embodiment of this application.

In the procedure in FIG. 3, if the first user plane device serving the first terminal device and the second user plane device serving the second terminal device are different devices, a data transmission channel of an indirect reachable path between the first user plane device and the second user plane device further needs to be configured. The data transmission channel includes an uplink data tunnel and a downlink data tunnel. For specific implementation steps, refer to FIG. 6. It should be noted that establishment of the data transmission channel is initiated through step 303. For ease of description, descriptions are provided from step 303.

Step 303: The control plane device sends a first message to the first user plane device, where the first message includes route configuration information.

The first message may include information such as the IP address of the second terminal device.

Optionally, the first message further includes one or both of the following:
data charging information, and monitoring and quality of service policy information indicating a rule for performing charging and monitoring on user data of the second terminal device that is forwarded by the first terminal device and indicating a quality of service guarantee requirement.

Step 306: The first user plane device sends a first response message to the control plane device.

The first user plane device may allocate a tunnel resource to the downlink data tunnel between the first user plane device and the second user plane device. The downlink data tunnel is used to transmit downlink data of the second terminal device from the second user plane device to the first user plane device.

Correspondingly, the first response message may include downlink data tunnel information corresponding to the downlink data tunnel. If the downlink data tunnel is a GTP tunnel, the downlink data tunnel information may include information such as an IP address and a tunnel endpoint identifier (TEID) of the downlink data tunnel.

Step 307: The control plane device sends a second message to the second user plane device.

The second message includes the downlink data tunnel information, the second message is used to request to configure an uplink data tunnel for the second terminal device, and the uplink data tunnel is used to transmit uplink data of the second terminal device from the first user plane device to the second user plane device.

Step 308: The user plane device sends a second response message to the control plane device.

The second user plane device may allocate a tunnel resource to the uplink data tunnel between the second user plane device and the first user plane device. Correspondingly, the second response message may include uplink data tunnel information corresponding to the uplink data tunnel. If the uplink data tunnel is a GTP tunnel, the uplink data tunnel information includes information such as an IP address and a TEID of the uplink data tunnel.

Step 309: The control plane device sends an acknowledgment message to the first user plane device, where the acknowledgment message includes the uplink data tunnel information.

According to the foregoing procedure, establishment of the data transmission channel between the first user plane device and the second user plane device for forwarding for the second terminal device is completed.

It should be noted that in the foregoing procedure, when the control plane device cannot directly communicate with the second user plane device, for example, communication is unreachable, or network configuration ownership is not allowed, a message between the control plane device and the second user plane device needs to be forwarded by another device. A specific process is not described.

It should be noted that, if the first user plane device serving the first terminal device and the second user plane device serving the second terminal device are a same device, the foregoing data channel establishment procedure is not required.

With reference to the foregoing description, it can be learned that when downlink data of the second terminal device arrives at the second user plane device, the second user plane device may send the data to the second terminal device through a first transmission path, that is, the indirect reachable path of the second terminal device, based on the route configuration information. Specifically, the downlink data of the second terminal device arrives at the first user plane device via the second user plane device, is forwarded from the first user plane device to the first terminal device, and is then forwarded to the second terminal device via the first terminal device. In terms of uplink, the second terminal device may send data through the first transmission path, that is, the indirect reachable path of the second terminal device, to send uplink data to the first terminal device. Specifically, the uplink data of the second terminal device is forwarded to the first user plane device via the first terminal device, the first user plane device forwards the uplink data to the second user plane device, and finally the second user plane device sends the uplink data to a target end.

In addition, when the downlink data of the second terminal device arrives at the second user plane device, the second user plane device may further send the data to the second terminal device through a second transmission path, that is, the direct reachable path of the second terminal device. Specifically, the downlink data of the second terminal device directly arrives at the second terminal device from the second user plane device through the RAN by using the data connection of the second terminal device. In terms of uplink, the second terminal device may send data through the second transmission path, that is, the direct reachable path of the second terminal device, and send uplink data to the second user plane device through an air interface and via the RAN. Finally, the second user plane device sends the uplink data to the target end.

Figure 7:
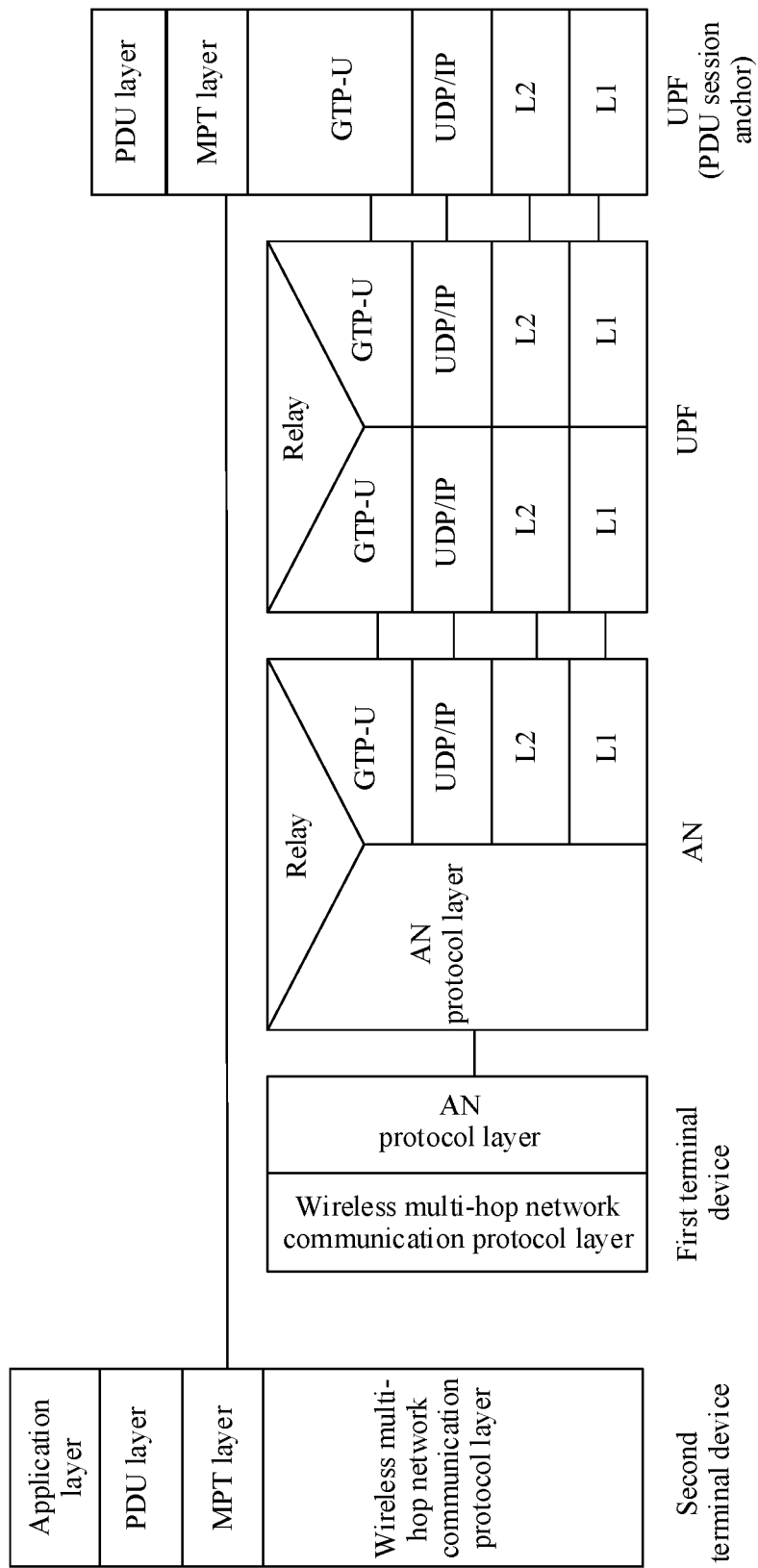
FIG. 7 is a schematic diagram of a user plane protocol stack according to an embodiment of this application.
Figure 8:
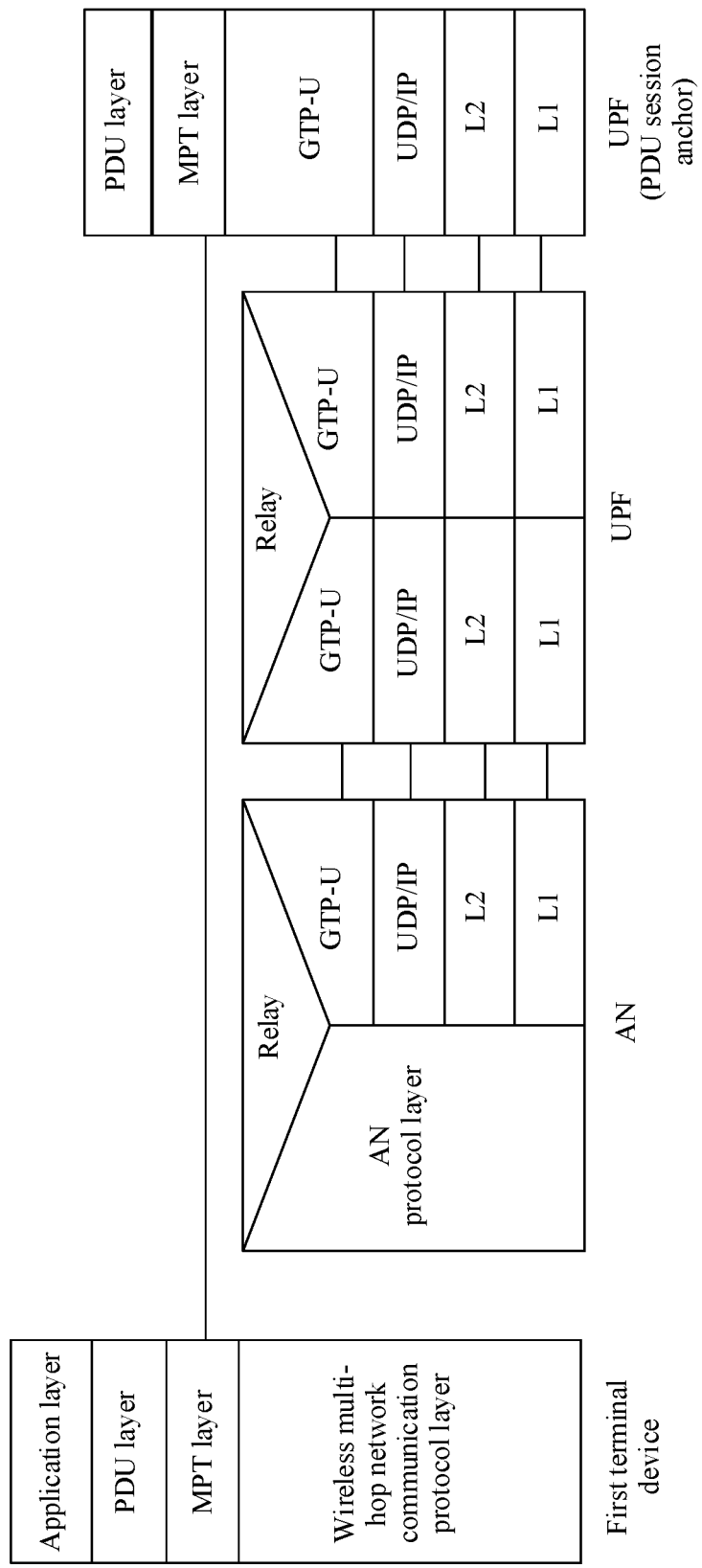
FIG. 8 is a schematic diagram of a user plane protocol stack according to an embodiment of this application.

To support high reliability, redundant multipath transmission needs to be used. In this embodiment of this application, a multipath transport (MPT) layer may be added between the terminal device and the UPF network element in a user plane protocol stack. For details, refer to FIG. 7 and FIG. 8. FIG. 7 is a schematic diagram of a user plane protocol stack between a second terminal device and a user plane device. FIG. 8 is a schematic diagram of a user plane protocol stack between a second terminal device and a user plane device. The multipath transport layer may also have another name. This is not limited in this embodiment of this application.

It should be noted that, for specific content and functions of each protocol layer in FIG. 7 and FIG. 8, refer to descriptions in the conventional technology. Details are not described herein.

In this embodiment of this application, an MPT header includes a packet sequence number field, used to record a sending sequence number of an MPT packet. An MPT layer of a transmit end replicates a packet that needs to be forwarded by an upper protocol layer (for example, an IP layer or a MAC layer), fills a same packet sending sequence number in an MPT header, and separately sends the packet through a plurality of reachable paths to a target terminal device. An MPT layer of a receive end removes a duplicate packet based on a sequence number of the received MPT packet. Through the foregoing redundant multipath transmission, a packet loss risk caused by instability of a single path can be resisted, and transmission reliability is improved.

Figure 9:
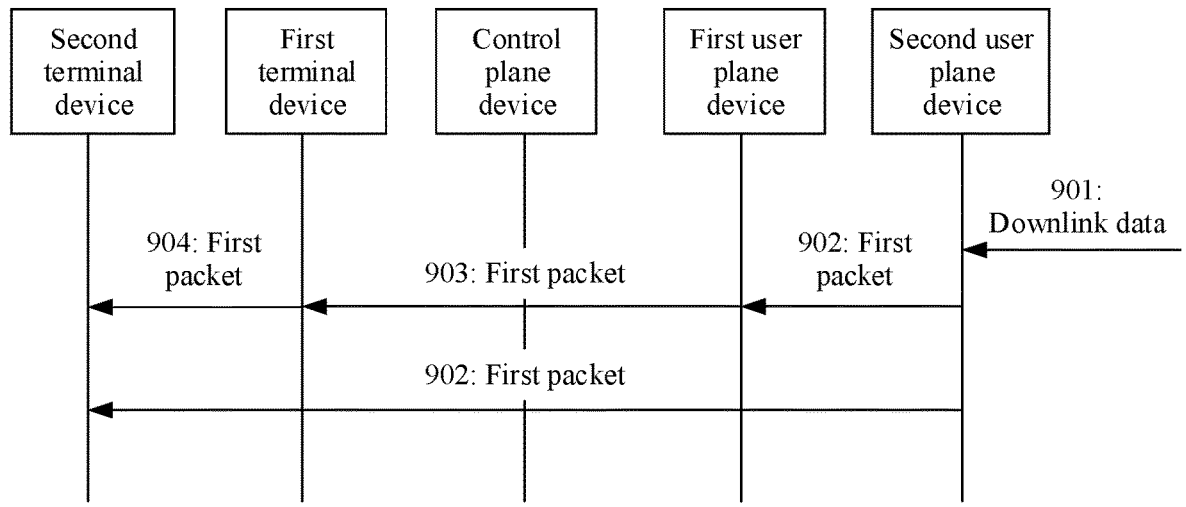
FIG. 9 is a schematic flowchart of downlink data transmission according to an embodiment of this application.

Specifically, FIG. 9 is a schematic diagram of transmitting a downlink packet through two paths in a multi-UPF scenario.

It should be noted that, in FIG. 9, when a packet including downlink data of the second terminal device arrives at the second user plane device, if the packet requires high reliability and is not allowed to be lost, for example, is important service signaling, the second user plane device may transmit the packet on both the first transmission path and the second transmission path, that is, send the packet on both the direct reachable path of the second terminal device and the indirect reachable path of the first terminal device. The second user plane device performs MPT layer encapsulation on the packet, fills in a destination address as an MPT layer address of the second terminal device, marks an MPT layer sequence number based on a record of a quantity of MPT layer packets previously sent by using a service flow, replicates the packet, and sends the packet through the foregoing both paths. Certainly, the second user plane device may alternatively select one of the paths to send the packet, and does not send the packet on the other path.

Step 901: The second user plane device receives downlink data of the second terminal device, and encapsulates the downlink data into a first packet.

The first packet includes a multipath transport layer header and the downlink data tunnel information, the multipath transport layer header includes a multipath transport layer sequence number corresponding to the downlink data, a destination address in the multipath transport layer header is the address corresponding to the second terminal device, and the first packet includes the downlink data of the second terminal device.

Step 902: The second user plane device sends the first packet.

Specifically, the second user plane device may perform one or both of the following:
  sending the first packet to the second terminal device through the second transmission path; and
  sending the first packet to the first user plane device through the downlink data tunnel between the second user plane device and the first user plane device.

Step 903: The first user plane device determines, based on downlink data tunnel information in a data tunnel layer header of the first packet or the destination address in the multipath transport layer header of the first packet, that a next hop of the first packet is the first terminal device on the first transmission path, and sends the first packet to the first terminal device.

Step 904: The first terminal device receives the first packet from the first user plane device, and sends the first packet to the second terminal device.

For a process of transmitting the first packet through the second transmission path, that is, the direct reachable path of the second terminal device, refer to descriptions in the conventional technology. Details are not described in this application.

Finally, the second terminal device receives the first packet from the first transmission path. If the second terminal device further receives another packet from the second transmission path, and if an MPT layer sequence number in the packet is the same as an MPT layer sequence number in the first packet, the second terminal device may determine that the two received packets are duplicate, and may discard one of the two packets. If an MPT layer sequence number in the packet is different from an MPT layer sequence number in the first packet, the second terminal device may determine that the two received packets are not duplicate, and may separately process the two packets.

Figure 10:
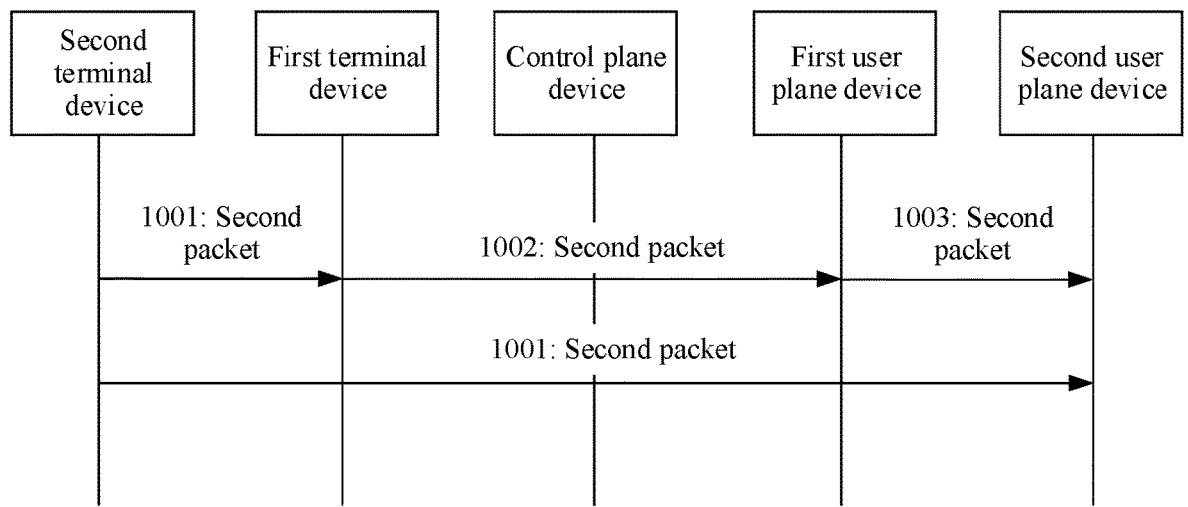
FIG. 10 is a schematic flowchart of uplink data transmission according to an embodiment of this application.

In the downlink data transmission case described above, this application is further applicable to uplink data transmission. FIG. 10 is a schematic diagram of multipath transmission of uplink data.

Step 1001: The second terminal device sends a second packet to the first terminal device, and sends the second packet to the second user plane device.

The second packet may include uplink data of the second terminal device, and a destination address in a multipath transport layer header of the second packet is an address corresponding to a second user plane device.

In this step, the second terminal device transmits the second packet through both the first transmission path (that is, the indirect reachable path) and the second transmission path (that is, the direct reachable path). Certainly, the second terminal device may alternatively transmit the second packet through only one transmission path according to an actual situation. Details are not described herein.

Step 1002: The first terminal device determines, based on the destination address in the multipath transport layer header of the second packet, that a next hop of the second packet is the first user plane device, and sends the second packet to the first user plane device.

Step 1003: If determining, based on the destination address in the multipath transport layer header of the second packet, that a next hop of the second packet is the second user plane device, the first user plane device adds uplink data tunnel information to the second packet, and sends the second packet to the second user plane device through an uplink data tunnel.

For a process of transmitting the second packet through the second transmission path, refer to the conventional technology. Details are not described herein.

Finally, the second user plane device may receive the second packet from the first user plane device through the uplink data tunnel, and receive the second packet from the second terminal device.

If the second user plane device further receives another packet from the second transmission path, it is assumed that the packet is referred to as a sixth packet. If an MPT layer sequence number in the sixth packet is the same as an MPT layer sequence number in the second packet, the second user plane device may determine that the two received packets are duplicate, and may discard one of the packets, and forward the other packet.

It can be learned from the foregoing descriptions that, according to the method provided in this application, a service loss caused by a packet loss on a single path can be resisted, and transmission reliability is significantly improved. If the second user plane device and the first user plane device are a same device, the second user plane device and the first user plane device in the foregoing example are the same, and a forwarding procedure between user plane devices is no longer required. Details are separately described below.

If the first user plane device can provide the user plane data forwarding service for the first terminal device and the second terminal device, a downlink data transmission procedure of the second terminal device is as follows:

Step 1: The first user plane device receives downlink data of the second terminal device.

Step 2: The first user plane device encapsulates the downlink data into a third packet.

The third packet includes a multipath transport layer header, the multipath transport layer header includes a multipath transport layer sequence number corresponding to the downlink data, and a destination address in the multipath transport layer header is the address corresponding to the second terminal device.

Step 3: The first user plane device sends the third packet to the first terminal device, and sends the third packet to the second terminal device.

Alternatively, the first user plane device may send the third packet only to the first terminal device or send the third packet only to the second terminal device. This may be specifically determined according to an actual situation. This is not limited in this embodiment of this application.

Step 4: The first terminal device receives the third packet, and forwards the third packet to the second terminal device.

If the second terminal device receives the third packet from the first terminal device and also receives the third packet from the first user plane device, the second terminal device may discard one of the third packets, and process only one of the third packets.

If the first user plane device can provide the user plane data forwarding service for the first terminal device and the second terminal device, an uplink data transmission procedure of the second terminal device is as follows:

Step 1: The second terminal device sends a fourth packet to the first terminal device, and sends the fourth packet to the first user plane device.

The fourth packet includes uplink data of the second terminal device, and a destination address in a multipath transport layer header of the fourth packet is an address corresponding to the first user plane device.

In this step, the second terminal device may alternatively send the fourth packet only to the first terminal device, or send the fourth packet only to the first user plane device according to an actual situation.

Step 2: The first terminal device receives the fourth packet, and forwards the fourth packet to the first user plane device.

Step 3: The first user plane device receives a fourth packet from the second terminal device through the second transmission path, and receives the fourth packet from the first terminal device through the first transmission path.

The first user plane device discards one of the two fourth packets, and forwards the other packet.

Clearly, the foregoing method can significantly improve transmission reliability and reduce a forwarding delay. For example, when a connection between a terminal device and a network is in an idle state, if there is no other indirect reachable path, data delivered by the network to the terminal device triggers paging of the terminal device. The downlink data is buffered. After the paging succeeds, the connection between the terminal device and the network changes to an active state, and the data can be sent to the terminal device. When the terminal device further has other indirect reachable paths, provided that a transit terminal device is connected to a network is on one of these indirect reachable paths, data delivered through the indirect reachable path may be directly sent to the target terminal device, to significantly reduce a delay.

In addition, to obtain a higher bandwidth, the MPT layer of the transmit end selects different reachable paths to send packets based on statuses of a plurality of reachable paths to the target, such as a delay, a packet loss rate, an available bandwidth, and a configured offloading policy. The MPT layer of the receive end collects MPT packets that arrive through different paths, sorts the packets based on sequence numbers (if an upper layer requires that the packets be transmitted in sequence), and delivers the packets to an upper protocol layer. For example, when the terminal device needs to perform a high-bandwidth data service, the network may perform, based on bandwidth capabilities of a plurality of direct or indirect reachable paths of the terminal device, data sending in proportion on the foregoing paths, to obtain a higher aggregated bandwidth.

To support the foregoing path selection, the MPT layer may further provide a function of detecting and monitoring data communication quality, including measurement of a delay, a bandwidth, a packet loss rate, a delay jitter, and the like, to make the most efficient and appropriate use of a multipath forwarding capability.

To protect data security, the MPT layer between the terminal device and the UPF provides packet encryption and integrity protection. For example, in a scenario in which the second terminal device sends and receives data between the first terminal device and the UPF, encryption and integrity protection are performed at the MPT layer on the data sent and received between the second terminal device and the UPF. In this way, the data forwarded by the first terminal device is not tampered with by the first terminal device, and the second terminal device does not need to worry about exposing data privacy to the first terminal device. It should be noted that the MPT layer needs to provide a data security protection function unless in a scenario in which terminal devices are fully trustworthy with each other.

Embodiments described in this specification may be independent solutions, or may be combined based on internal logic. All these solutions fall within the protection scope of this application.

In the foregoing embodiments provided in this application, the methods provided in embodiments of this application are separately described from a perspective of interaction between devices. To implement the functions in the methods provided in the embodiments of this application, devices such as the control plane device, the first terminal device, and the first user plane device may include hardware structures and/or software modules, and implement the foregoing functions by using the hardware structures, the software modules, or a combination of the hardware structures and the software modules. Whether a function in the foregoing functions is performed by using the hardware structure, the software module, or the combination of the hardware structure and the software module depends on particular applications and design constraints of the technical solutions.

In embodiments of this application, module division is an example, and is merely a logical function division. During actual implementation, another division manner may be used. In addition, functional modules in embodiments of this application may be integrated into one processor, or may exist alone physically, or two or more modules may be integrated into one module. The integrated module may be implemented in a form of hardware, or may be implemented in a form of a software functional module.

Figure 11:
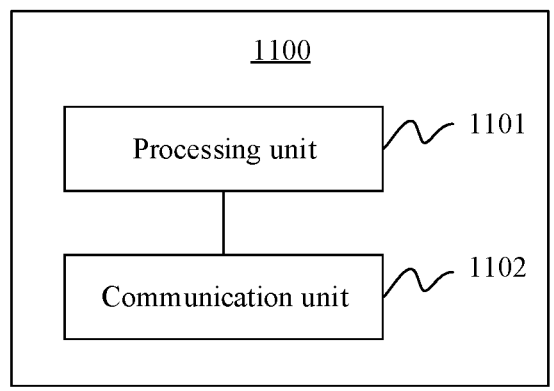
FIG. 11 is a schematic structural diagram of a communication apparatus according to an embodiment of this application.

Same as the foregoing concept, as shown in FIG. 11, an embodiment of this application further provides an apparatus 1100, configured to implement a function of the control plane device, the first terminal device, the first user plane device, or the second user plane device in the foregoing methods. For example, the apparatus may be a software module or a chip system. In this embodiment of this application, the chip system may include a chip, or may include a chip and another discrete component. The apparatus 1100 may include a processing unit 1101 and a communication unit 1102.

In this embodiment of this application, the communication unit may also be referred to as a transceiver unit, and may include a sending unit and/or a receiving unit, which are respectively configured to perform sending and receiving steps of the terminal device or the network device in the foregoing method embodiments.

Figure 12:
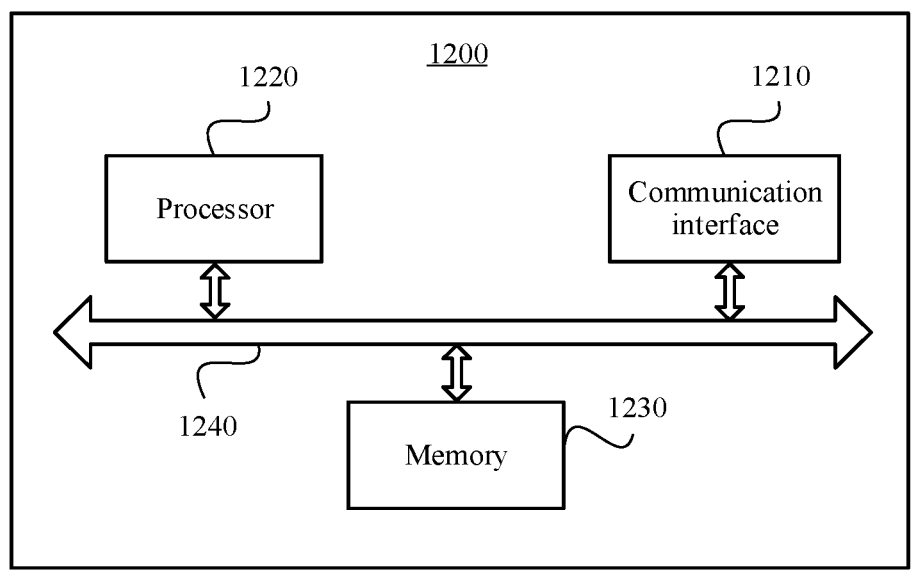
FIG. 12 is a schematic structural diagram of a communication apparatus according to an embodiment of this application.

The following describes in detail a communication apparatus provided in embodiments of this application with reference to FIG. 11 and FIG. 12. It should be understood that descriptions of apparatus embodiments correspond to the descriptions of the method embodiments. Therefore, for content that is not described in detail, refer to the foregoing method embodiments. For brevity, details are not described herein again.

In a possible design, the apparatus 1100 may implement steps or procedures corresponding to the terminal device or the network device in the foregoing method embodiments. Descriptions are separately provided below.

For example, when the apparatus 1100 implements the function of the control plane device,
- the processing unit is configured to obtain first information of a first terminal device by using the communication unit, where the first information indicates a terminal device that has mutual trust with the first terminal device, and the terminal device that has mutual trust with the first terminal device includes a second terminal device; and
- the processing unit is configured to send a first message to a first user plane device by using the communication unit, where the first message includes route configuration information, the route configuration information is used to configure a first transmission path, the first transmission path is used to transmit uplink or downlink data of the second terminal device via the first terminal device, and the first user plane device is configured to provide a user plane data forwarding service for the first terminal device.

For example, when the apparatus 1100 implements the function of the first user plane device,
- the communication unit is configured to receive a first message from a control plane device, where the first message includes route configuration information, the route configuration information is used to configure a first transmission path, and the first transmission path is used to transmit uplink or downlink data of a second terminal device via a first terminal device; and
- the processing unit is configured to configure the first transmission path based on the route configuration information.

For example, when the apparatus 1100 implements the function of the first terminal device,
- the processing unit is configured to obtain first information by using the communication unit, where the first information includes identification information of a terminal device that has mutual trust with the first terminal device, and the terminal device that has mutual trust with the first terminal device includes a second terminal device; and
- the processing unit is configured to send the first information to a control plane device by using the communication unit, where the first information indicates to establish a first transmission path, and the first transmission path is used to transmit uplink or downlink data of the second terminal device via the first terminal device.

For example, when the apparatus 1100 implements the function of the second user plane device,
- the processing unit is configured to receive a second message from a control plane device by using the communication unit, where the second message includes downlink data tunnel information, the second message is used to request to configure an uplink data tunnel for a second terminal device, the uplink data tunnel is used to transmit uplink data of the second terminal device from a first user plane device to the second user plane device, and a downlink data tunnel corresponding to the downlink data tunnel information is used to transmit downlink data of the second terminal device from the second user plane device to the first user plane device; and
- the processing unit is configured to send a second response message to the control plane device by using the communication unit, where the second response message includes uplink data tunnel information corresponding to the uplink data tunnel.

FIG. 12 shows an apparatus 1200 according to an embodiment of this application. The apparatus shown in FIG. 12 may be an implementation of a hardware circuit of the apparatus shown in FIG. 11. The communication apparatus is applicable to the flowchart shown in FIG. 2, and performs functions of the terminal device or the network device in the foregoing method embodiments. For ease of description, FIG. 12 merely shows main components of the communication apparatus.

The apparatus 1200 shown in FIG. 12 includes at least one processor 1220, configured to implement any method in FIG. 2 provided in embodiments of this application.

The apparatus 1200 may further include at least one memory 1230, configured to store program instructions and/or data. The memory 1230 is coupled to the processor 1220. The coupling in this embodiment of this application may be an indirect coupling or a communication connection between apparatuses, units, or modules in an electrical form, a mechanical form, or another form, and is used for information exchange between the apparatuses, the units, or the modules. The processor 1220 may operate in collaboration with the memory 1230. The processor 1220 may execute the program instructions stored in the memory 1230. At least one of the at least one memory may be included in the processor.

The processor 1220 in the communication apparatus 1200 is configured to implement a function of the processing unit 1101, and the communication interface 1210 is configured to implement a function of the communication unit 1102.

In an implementation process, steps in the foregoing methods can be implemented by using a hardware integrated logical circuit in the processor, or by using instructions in a form of software. The steps of the methods disclosed with reference to embodiments of this application may be performed by a hardware processor, or may be performed by using a combination of hardware in the processor and a software module. The software module may be located in a conventional storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor. To avoid repetition, details are not described herein again.

It should be noted that, the processor in this embodiment of this application may be an integrated circuit chip, and has a signal processing capability. In an implementation process, steps in the foregoing method embodiments can be implemented by using a hardware integrated logical circuit in the processor, or by using instructions in a form of software.

It may be understood that the memory in this embodiment of this application may be a volatile memory or a nonvolatile memory, or may include a volatile memory and a nonvolatile memory. It should be noted that the memory of the systems and methods described in this specification includes but is not limited to these and any memory of another appropriate type.

In this embodiment of this application, the communication interface may be a transceiver, a circuit, a bus, a module, or a communication interface of another type. In this embodiment of this application, when the communication interface is the transceiver, the transceiver may include an independent receiver and an independent transmitter, or may be a transceiver integrated with a transceiver function, or may be an interface circuit.

The apparatus 1200 may further include a communication line 1240. The communication interface 1210, the processor 1220, and the memory 1230 may be connected to each other through the communication line 1240. The communication line 1240 may be a peripheral component interconnect (PCI for short) bus, an extended industry standard architecture (EISA for short) bus, or the like. The communication line 1240 may be classified into an address bus, a data bus, a control bus, and the like. For ease of representation, only one thick line is for representing the bus in FIG. 12, but this does not mean that there is only one bus or only one type of bus.

A person skilled in the art should understand that embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, an optical memory, and the like) that include computer-usable program code.

This application is described with reference to the flowcharts and/or the block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams.

It is clearly that, a person skilled in the art can make various modifications and variations to this application without departing from the scope of this application. In this way, this application is intended to cover these modifications and variations of this application provided that they fall within the scope of the claims of this application and their equivalent technologies.

What is claimed is:

1. A communication method, comprising:
obtaining, by a control plane device, information of a first terminal device, wherein the information indicates a second terminal device that has mutual trust with the first terminal device; and
sending, by the control plane device, a first message to a first user plane device, wherein the first message comprises route configuration information, the route configuration information is used to configure a first transmission path used to transmit uplink or downlink data of the second terminal device via the first terminal device, and the first user plane device is configured to provide a user plane data forwarding service for the first terminal device.

2. The method according to claim 1, further comprising:
sending, by the control plane device, an authentication request message to the second terminal device via the first terminal device, wherein the authentication request message comprises verification information used to verify an identity of the second terminal device.

3. The method according to claim 2, wherein the control plane device receives an authentication response message from the first terminal device, wherein the authentication response message comprises verification response information; and
if determining, based on the verification response information, that the identity verification of the second terminal device succeeds, the control plane device determines that the uplink or downlink data of the second terminal device can be transmitted via the first terminal device.

4. The method according to claim 1, wherein if the first terminal device and the second terminal device are provided with user plane data forwarding services by different user plane devices, the method further comprises:
receiving, by the control plane device, a first response message from the first user plane device, wherein the first response message comprises downlink data tunnel information corresponding to a downlink data tunnel, and the downlink data tunnel is used to transmit downlink data of the second terminal device from a second user plane device to the first user plane device;
sending, by the control plane device, a second message to the second user plane device, wherein the second message comprises the downlink data tunnel information, the second message is used to request to configure an uplink data tunnel for the second terminal device, the uplink data tunnel is used to transmit uplink data of the second terminal device from the first user plane device to the second user plane device, and the second user plane device is configured to provide a user plane data forwarding service for the second terminal device;
receiving, by the control plane device, a second response message from the second user plane device, wherein the second response message comprises uplink data tunnel information corresponding to the uplink data tunnel; and
sending, by the control plane device, an acknowledgment message to the first user plane device, wherein the acknowledgment message comprises the uplink data tunnel information.

5. The method according to claim 4, wherein the downlink data tunnel information comprises an Internet protocol (IP) address and a tunnel endpoint identifier (TEID) of the downlink data tunnel; and
the uplink data tunnel information comprises an IP address and a TEID of the uplink data tunnel.

6. The method according to claim 1, wherein the first message further comprises one or both of the following:
data charging information, and monitoring and quality of service policy information indicating a rule for performing charging and monitoring on user data of the second terminal device that is forwarded by the first terminal device and indicating a quality of service guarantee requirement.

7. A communication method, comprising:
receiving, by a first user plane device, a first message from a control plane device, wherein the first message comprises route configuration information used to configure a first transmission path, and the first transmission path is used to transmit uplink or downlink data of a second terminal device via a first terminal device; and
configuring, by the first user plane device, the first transmission path based on the route configuration information.

8. The method according to claim 7, wherein if the first terminal device and the second terminal device are provided with user plane data forwarding services by different user plane devices, then configuring, by the first user plane device, the first transmission path based on the route configuration information comprises:
establishing, by the first user plane device, a downlink data tunnel used to transmit downlink data of the second terminal device from a second user plane device to the first user plane device; and
sending, by the first user plane device, a response message to the control plane device, wherein the response message comprises downlink data tunnel information corresponding to the downlink data tunnel.

9. The method according to claim 8, wherein the method further comprises:
receiving, by the first user plane device, an acknowledgment message from the control plane device, wherein the acknowledgment message comprises uplink data tunnel information corresponding to an uplink data tunnel used to transmit uplink data of the second terminal device from the first user plane device to the second user plane device, and the second user plane device is configured to provide a user plane data forwarding service for the second terminal device.

10. The method according to claim 9, wherein the method further comprises:
receiving, by the first user plane device, a first packet from the second user plane device through the downlink data tunnel, wherein the first packet comprises downlink data of the second terminal device, and destination address information in a data tunnel layer header of the first packet comprises the downlink data tunnel information;
determining, by the first user plane device based on the downlink data tunnel information, that a next hop of the first packet is the first terminal device on the first transmission path; and
sending, by the first user plane device, the first packet to the first terminal device.

11. The method according to claim 9, wherein the method further comprises:
receiving, by the first user plane device, a second packet from the first terminal device, wherein a destination address in a multipath transport layer header of the second packet is an address corresponding to the second user plane device;
determining, by the first user plane device based on the destination address in the multipath transport layer header of the second packet, that a next hop of the second packet is the second user plane device; and
adding, by the first user plane device, the uplink data tunnel information to the second packet, and sending the second packet to the second user plane device through the uplink data tunnel.

12. The method according to claim 7, wherein the first user plane device is further configured to provide a user plane data forwarding service for the second terminal device, and the method further comprises:
receiving, by the first user plane device, downlink data of the second terminal device;
encapsulating, by the first user plane device, the downlink data into a third packet; and
sending, by the first user plane device, the third packet to the second terminal device through the first transmission path, and/or sending the third packet to the second terminal device through a second transmission path that is a data channel between the second terminal device and the first user plane device and that is connected via an access network device.

13. The method according to claim 7, wherein the first user plane device is further configured to provide the user plane data forwarding service for the second terminal device, and the method further comprises:
receiving, by the first user plane device, a fourth packet from the second terminal device through a second transmission path, and receiving a fifth packet from the first terminal device through the first transmission path, wherein a multipath transport layer header of the fourth packet comprises a first multipath transport layer sequence number, a multipath transport layer header of the fifth packet comprises a second multipath transport layer sequence number, and the second transmission path is the data channel that is between the second terminal device and the first user plane device and that is connected via the access network device;
if determining that the first multipath transport layer sequence number is equal to the second multipath transport layer sequence number, determining, by the first user plane device, that the fourth packet and the fifth packet are duplicate packets; and
discarding, by the first user plane device, one of the fourth packet and the fifth packet, and forwarding the other of the fourth and fifth packets.

14. The method according to claim 7, wherein the method further comprises:
sending, by the first user plane device, a detection packet to the second terminal device via the first terminal device; and
if receiving an acknowledgment packet from the second terminal device, determining, by the first user plane device, that the first transmission path is valid.

15. The method according to claim 7, wherein the method further comprises:
sending, by the first user plane device, a route reachability broadcast request to the first terminal device; and
receiving, by the first user plane device, a route reachability broadcast response from the first terminal device, wherein the route reachability broadcast response comprises first information indicating the second terminal device has mutual trust with the first terminal device.

16. A control plane device, comprising:
at least one processor; and
a memory, storing instructions, which when executed by the at least one processor, cause the control plane device to implement the following method:
obtain obtaining first information of a first terminal device, wherein the first information indicates a second terminal device that has mutual trust with the first terminal device, and the terminal device that has mutual trust with the first terminal device comprises a second terminal device; and
send sending a first message to a first user plane device, wherein the first message comprises route configuration information, the route configuration information is used to configure a first transmission path, the first transmission path is used to transmit uplink or downlink data of the second terminal device via the first terminal device, and the first user plane device is configured to provide a user plane data forwarding service for the first terminal device.

17. The control plane device according to claim 16, wherein when the instructions are executed by the at least one processor, further cause the control plane device to
send an authentication request message to the second terminal device via the first terminal device, wherein the authentication request message comprises verification information used to verify an identity of the second terminal device.

18. The control plane device according to claim 17, wherein when the instructions are executed by the at least one processor, further cause the control plane device to
receive, from the first terminal device, an authentication response message comprising verification response information; and
determine, based on the verification response information, that the identity verification of the second terminal device was successful, and determine that the uplink or downlink data of the second terminal device can be transmitted via the first terminal device.

19. The control plane device according to claim 16, wherein the first message further comprises one or both of the following:
data charging information, and monitoring and quality of service policy information indicating a rule for performing charging and monitoring on user data of the second terminal device that is forwarded by the first terminal device and indicating a quality of service guarantee requirement.

\* \* \* \* \*